Figure 1:
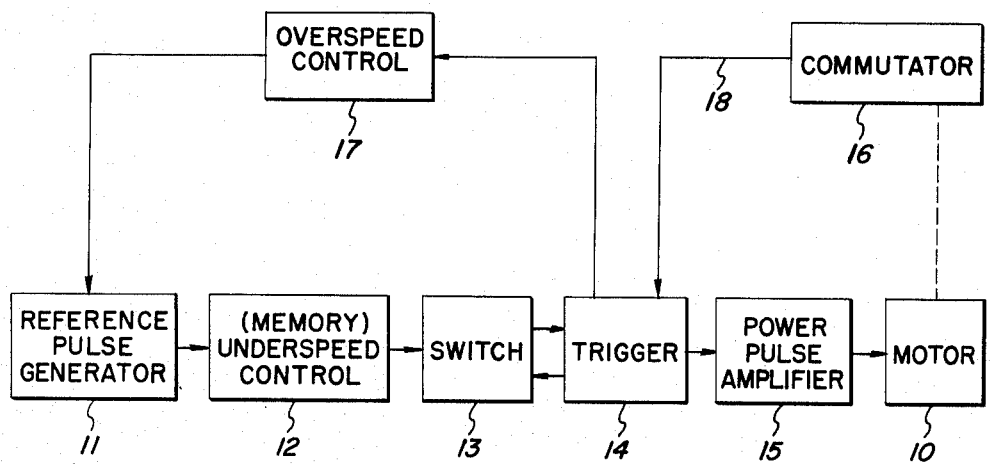

June 21, 1966 W. G. POLAKOWSKI 3,257,595
PULSE WIDTH MODULATOR FOR SPEED CONTROL SYSTEM
Filed June 10, 1963

INVENTOR.
WILLIAM G. POLAKOWSKI
BY
ATTORNEY

United States Patent Office 3,257,595
Patented June 21, 1966

3,257,595
PULSE WIDTH MODULATOR FOR SPEED CONTROL SYSTEM
William G. Polakowski, Dayton, Ohio, assignor to Globe Industries, Inc., Dayton, Ohio, a corporation of Ohio
Filed June 10, 1963, Ser. No. 286,602
14 Claims. (Cl. 318—314)

This invention generally relates to pulse operated speed control systems for motors, and is particularly concerned with improvements in small, lightweight, and inexpensive speed controls that are particularly adapted for precision speed control of fractional or subfractional horsepower direct current motors.

Very generally according to the present invention, there is provided a low-cost electronic motor speed control employing a reference source of pulses for producing pulses at the desired motor speed, a feedback commutator or other inexpensive mechanical switching means being coupled to the motor for producing impulses at the actual motor speed, and a control circuit for energizing the motor with power impulses having a variable duration or on-off time to accelerate or decelerate the motor into frequency and phase synchronization with the pulse source. For rapidly accelerating the motor when its speed is below that desired, the control circuit is provided with an under speed control including an improved memory circuit for detecting when the rate of the motor speed pulses are below the rate of the reference source of pulses, and operating to maintain substantially continuous pulse energization of the motor until the motor accelerates to the desired speed. For rapidly decelerating the motor when its speed greatly exceeds that desired, there is provided an overspeed detector for substantially discontinuing the pulse de-energization of the desired speed. Both the underspeed and overspeed control circuitry are adapted to rapidly respond within a brief time interval of only one cycle of the reference pulse source, or within one cycle of the commutator or switching feedback pulses.

It is accordingly, a principal object of the invention to provide a precision pulse operated motor control system that is small, lightweight, possesses a minimum number of components, and is therefore inexpensive.

A further object of the invention is to provide such an inexpensive motor control system employing a pulse generator that is capable of maintaining the motor speed constant substantially dependant only on the accuracy of the pulse generator, which may be 1% or better of the selected speed.

Another object is to provide such a motor control system comprised exclusively of a minimum number of solid state components operating in the on-off switching mode and providing higher accuracy and considerable simplification over available systems.

A still further object is to provide such a speed control that is regulated by means of a motor driven commutation or simple switching mechanism requiring very low power and current capability.

Figure 2:
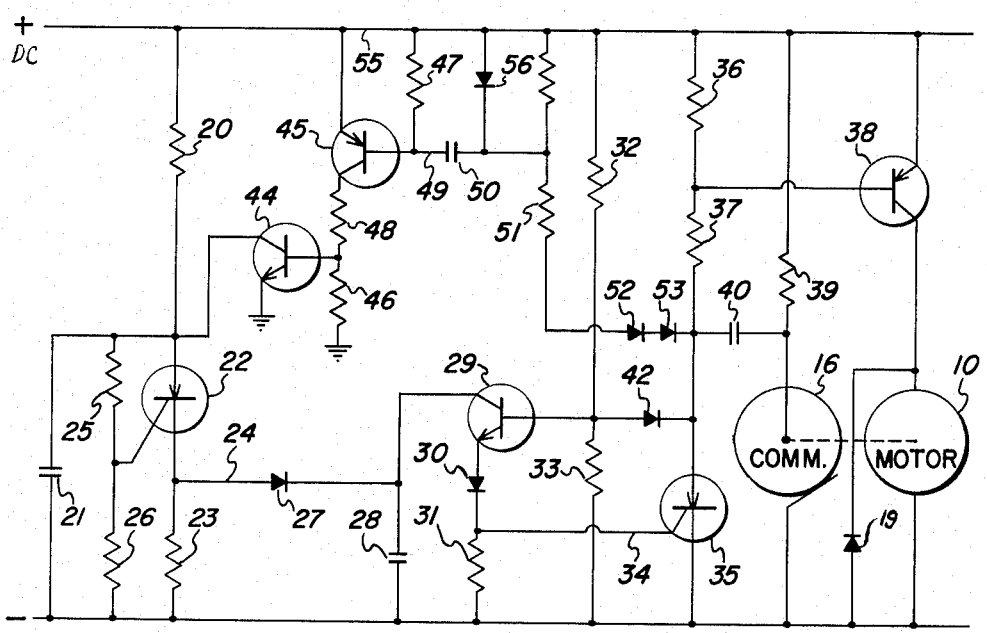

Other objects and many additional advantages of the present invention will be more readily understood by those skilled in the art after a detailed consideration of the following specification taken with the accompanying drawings wherein:

FIGURE 1 is a block diagram representation of one preferred motor control system according to the present invention, and FIGURE 2 is an electrical schematic diagram illustrating preferred circuitry for performing the functions illustrated by the block diagram of FIGURE 1.

Referring now to the drawings there is shown in FIGURE 1 a block diagram of a preferred pulse operating speed control system that is particularly adapted for use in controlling a small fractional horsepower or subfractional horsepower direct current motor 10, although as will be apparent to those skilled in the art it may be employed for larger motors and other types. As shown, the system generally comprises a reference pulse generator 11, a memory or underspeed control circuit 12, a switch circuit 13, a trigger circuit 14, a power pulse amplifier 15, a commutator or a simple switching means 16 being driven by the direct current motor 10, and an overspeed circuit 17.

In a normal mode of operation with the motor being driven at a speed proportional to the rate or frequency of the impulses being supplied by the pulse generator 11, each of the pulses from the generator 11 is directed through the memory circuit 12 and switch 13 to operate the trigger circuit 14, which in turn controls the amplifier 15 to apply a power pulse to the motor 10. This power pulse continues until the commutator or switch 16 being coupled to the motor 10 produces a reset pulse over line 18 being directed in feedback to the trigger circuit 14. This reset pulse functions to reset the trigger circuit 14 and thereby operates to remove the power pulse from energizing the motor 10. In a preferred embodiment, the commutator 16 is adapted to be rotatably driven by the motor 10 and functions to produce one reset impulse for each revolution of the motor shaft (not shown) whereby when the motor is in speed synchronism with the impulses from the pulse generator 11, the reset impulses occur almost directly after each pulse generator impulse, and the motor 10 is energized by very short duration power pulses containing sufficient energy to maintain the motor driven at a speed controlled by the frequency of the pulse generator 11.

In the event that the motor should slow down due to an increasing load or for other reason, the production of the reset pulse is similarly delayed, whereupon the duration of the power pulse being applied to the motor is increased. The motor accordingly receives a greater amount of energy and is therefore automatically accelerated to increase its speed. Alternatively, should the motor speed temporarily increase, each reset pulse is advanced or occurs sooner after the production of each generator pulse 11, thereby resulting in a reduction in the time duration of the power impulse being applied to the motor, and hence reducing the energy applied to the motor to slow down the motor. Thus in the normal mode of operation when the motor is being driven at the correct speed, the motor is energized by a repetitive series of short duration power impulses, which automatically increase in time duration if the motor tends to slow down, or automatically decreases in time duration if the motor tends to speed up, thereby counteracting changes of the motor speed and continually regulating the motor into synchronism with the reference pulse generator 11.

In a second mode of operation, where the motor speed is slower than the frequency of the reference pulse generator, such as during the initial acceleration of the motor or as may occur upon the abrupt application of a heavy load to the motor, the pulse rate being produced by the generator 11 exceeds the frequency of the reset pulses produced by the commutator 16, and the reset pulses from the commutator are not produced in time delay synchronism after each generator pulse, as in the normal mode. In this case, more than one generator pulse is produced before a reset pulse is received from the commutator 16. To rapidly increase the amount of power applied to the motor and bring it to synchronized speed, there is provided a memory circuit 12 and switch circuit 13 which respond to the second or additional generator pulses produced before the reset pulse is received, and store these additional pulses until the next reset pulse is received. When this next reset pulses is then received and functions to turn off the power being applied to the motor, the memory circuit 12 and switch 13 operates almost simultaneously thereafter to again initiate the trigger circuit and reapply the power pulse to the motor. Thus, in the event that the frequency of the reference pulse generator is greater than the frequency of the commutator reset pulses, the memory circuit 12 and switch 13 operate to store any additional pulses produced by the reference pulse generator and immediately reapply power to the motor after each reset thereof, whereby the motor receives a substantially continuous energization until it reaches synchronism. This memory action persists so long as the pulse rate or frequency of the pulse generator 11 is greater than that of the reset pulses produced by the commutator 16 and is automatically terminated when the commutator reset pulse frequency is the same as the frequency of the pulse generator.

In the third mode of operation where the motor speed rapidly increases over that desired, such as may occur when the motor load is abruptly changed or removed, it is desired to automatically de-energize the motor until such time as it again slows down into synchronism with reference pulse generator 11. In this case, the frequency or rate of pulses produced by the commutator 16 exceed the frequency of pulses produced by the pulse generator 11. To perform this function, the overspeed control circuit 17 is provided to detect the greater frequency of the reset pulses, and functions in feedback to disable the reference pulse generator 11 from producing succeeding pulses to the trigger circuit 14, thereby preventing the application of power pulses to the motor and until such time as the motor slows down into synchronism with the reference pulse generator 11.

FIGURE 2 illustrates details of one preferred motor control circuit corresponding to the block diagram of FIGURE 1.

As shown, the reference pulse generator 11 preferably comprises a relaxation oscillator including a series connected resistor 20 and capacitor 21, and a silicon controlled rectifier 22 for periodically discharging the capacitor 21 to produce a regular time series of impulses over output line 24. In operation, the capacitor 21 and resistor 20 are connected across the direct current source, and the capacitor 21 is gradually charged at a rate determined by the time constant of the resistor 20 and capacitor 21. The voltage across the capacitor 21 is detected by means of a potential divider comprising resistors 25 and 26 being connected in parallel with the capacitor 21, and the junction of these resistors is connected to the control electrode of the silicon controlled rectifier 22. The rectifier 22 is connected in series with a small resistance 23 and both being across the capacitor 21, whereby when the voltage across the capacitor 21 reaches a predetermined level, the silicon controlled rectifier 22 is triggered into operation and discharges the capacitor 21, producing a short duration triggering pulse across resistor 23.

This short duration triggering pulse is directed over line 24 and through a forwardly biased diode 27 to a capacitor 28, functioning in this case as a memory circuit to store a uniform charge in response to each trigger pulse.

In parallel with the memory capacitor 28, there is provided a transistor 29 in series with a diode 30 and a resistance 31. The transistor 29 is normally biased into a conducting condition by means of its base electrode being positively biased at the junction of resistors 32 and 33, whereby the charge stored on memory capacitor 28 is discharged through the transistor 29 and appears across the resistor 31 as a voltage pulse.

This voltage pulse appearing across resistor 31 is applied over line 34 to trigger a silicon controlled rectifier 35 into conduction, thereby drawing current through resistors 36 and 37 in series therewith, and applying a more negative potential to the base electrode of a power transistor 38 being connected in series with motor 10, thereby to energize power transistor 38 into conduction and apply a power pulse to the motor. Thus, in response to each pulse being produced by the relaxation oscillator, the trigger circuit, including silicon controlled rectifier 35, is rendered conductive to turn on a power transistor 38 and apply energization to the motor 10. The conduction of silicon controlled rectifier 35 also draws current through a resistor 39 and a capacitor 40 to charge a capacitor 40 with the polarity illustrated in the drawing.

Presupposing that the motor is being driven in rate synchronism with reference pulse generator 11, a short time later the commutator 16 driven by the motor closes its switch to short circuit the capacitor 40 in parallel with the silicon controlled rectifier 35, thereby applying a negative potential to extinguish the silicon controlled rectifier 35, and prevent further current flow through the series connected resistors 36 and 37. This removes the negative bias from the power transistor 38, rendering the power transistor 38 again nonconducting, and thereby terminates the power pulse being applied to the motor 10. When the motor is turned off the energy stored in the motor winding is dissipated through diode 19, the high voltage short duration spike is thus prevented from damaging the power transistor 38.

Thus, as described above in connection with FIGURE 1, the commutator 16 functions to reset the silicon controlled rectifier 35, thereby terminating the pulse energization applied to the motor 10.

This action as described above repeats for each of the pulses produced by the relaxation oscillator so long as the motor rotates in frequency synchronism with the oscillator pulses; with each oscillator pulse initiating the application of a power pulse to the motor and each reset pulse from the commutator terminating that power pulse after an interval determined by the delayed phase relationship existing between the reset pulses and the oscillator pulses. As described above, in the event that the motor tends to slow down but still remains in frequency synchronism with the relaxation oscillator, the time duration or width of the power pulse being applied to the motor is accordingly increased since the commutator closes its switch later during each rotation due to the slowing down of the motor. This increased duration power pulse speeds up the motor so that during the next succeeding cycles, the commutator switch closes earlier, thereby to maintain the motor in phase synchronism with the relaxation oscillator. Similarly, if the motor should tend to increase speed, the commutator 16 closes its switch sooner after each relaxation oscillator pulse, and thereby terminates the power pulse being applied to the motor sooner during each cycle than is required, accordingly slowing down the motor again to maintain phase synchronization with the relaxation oscillator.

As noted above, the transistor 29 is normally biased into conducting condition by means of the positive potential existing at the junction of resistors 32 and 33. However, the base electrode of transistor 29 is also connected by means of diode 42 to the silicon controlled rectifier 35, whereby whenever the silicon controlled rectifier 35 is rendered conductive, the voltage bias at the base electrode of transistor 29 drops to ground potential, and the transistor 29 is rendered nonconducting and prevents further discharge of capacitor 28 therethrough. As a result of this switching action, each impulse from the relaxation oscillator, received after a reset pulse, and being stored by the memory capacitor 28 is permitted to pass through the transistor switch 29 and trigger the rectifier 35 into conduction as discussed above. However, in the event that an oscillator pulse is produced while the motor is receiving power (rectifier 35 conducting) the transistor switch 29 is open and prevents the capacitor 28 from discharging the latter pulse therethrough.

In the second mode of operation of the circuit, when the motor speed is not in frequency synchronism with the relaxation oscillator, there is more than one pulse being produced by the relaxation oscillator before the next reset pulse is received by the closing of the commutator switch 16. The first of these pulses being produced by the relaxation oscillator is stored on the memory capacitor 28 and discharged through transistor 29 as described above, and is consequently employed to trigger the rectifier 35 into operation, and thereby initiate the application of a power pulse to the motor 10. Upon the rectifier 35 being conducting, however, the transistor switch 29 is opened to isolate the memory capacitor 28, whereby upon the next oscillator pulse being produced, it is retained on the capacitor 28 and cannot discharge through the now open transistor switch 29. Thus, in the event that the relaxation oscillator is operating at a higher frequency than the rate of switching of the commutator 16, additional pulses are produced by the relaxation oscillator and stored on the capacitor 28 which thereby functions as a memory circuit. Upon the subsequent closing of the commutator 16 and the resetting of the rectifier 35, the transistor switch 29 is again biased into conducting condition and permits the charge stored on the memory capacitor 28 to discharge therethrough. This additional memory pulse, almost immediately discharges through the transistor switch 29 and again triggers the rectifier 35 into conduction, thereby to reapply power pulse to the motor 10. Thus, by the functioning of the capacitor 28 the circuit is almost immediately triggered into operating, after each reset, since as soon as the reset pulse is produced by the commutator 16, the stored pulse on the memory capacitor 28 almost immediately triggers the circuit into operation again, thereby to maintain almost continuous energization of the motor 10 until it reaches frequency synchronization with the relaxation oscillator. When frequency synchronization is again reached, the circuit then resumes operation in its normal mode as discussed above.

For overspeed regulation of the motor 10 when the motor is operating at a speed greater than the frequency of the reference pulse source, there is provided a means for delaying the producing of the oscillator reference pulses which in turn delays the application of the power pulses to the motor until the motor slows down into substantial synchronism with the frequency of the oscillator reference source. This function is performed by the use of switching transistors 44 and 45 and their associated circuitry, which together function to periodically short circuit the capacitor 21 and hence prevent the build up of voltage thereon sufficient to operate the relaxation oscillator.

Referring to FIGURE 2 for a detailed consideration of this overspeed regulation, the emitter and collector electrodes of transistor 44 are connected in shunt with the capacitor 21 of the oscillator, whereby whenever the transistor 44 is rendered conducting, the capacitor 21 is discharged through this transistor. The transistor 44 and transistor 45 are normally biased for nonconducting condition, since the base electrode of transistor 45 is connected to the positive potential of the battery through a resistor 47, and the base electrode of transistor 45 is connected to the positive potential of the battery through a resistor 47, and the base electrode of transistor 44 is grounded through a resistor 46. However, upon the transistor 45 receiving a sufficiently negative going impulse over line 49 to its base electrode, it is switched to conducting condition, producing current flow through series connected resistors 48 and 46 and thereby producing a positive voltage drop across the resistor 46 to turn on the transistor 44.

The base electrode of transistor 45 is coupled to the circuit of the commutator switch 16 through a series connected capacitor 50, a resistor 51, a pair of reversely biased diodes 52 and 53, and through capacitor 40. Whenever the commutator switch 16 is closed, and the silicon controlled rectifier 35 is non-conducting then a negative pulse is coupled through capacitor 50 and is directed to the base electrode of transistor 45.

However, in the event that the motor speed exceeds the oscillator frequency, the commutator switch 16 closes twice in succession before the next oscillator pulse is produced. The first negative pulse produced resets the silicon controlled rectifier to the non-conducting state, as indicated above.

At the occurrence of the second negative pulse and before the occurrence of the next oscillator pulse, the base electrode of transistor 45 is coupled through capacitor 50 to such pulse, thus overcoming the positive biasing of the transistor 45, and it thereby switches the transistor 45 into conducting condition. As discussed above, whenever transistor 45 is made conducting, the second transistor 44 is also rendered conductive and thereby momentarily short circuits the capacitor 21 in the relaxation oscillator, discharging its potential to substantially ground. The shorting of capacitor 21 delays the production of the next oscillator impulse, since the capacitor 21 must then commence to change again from a zero potential to a level sufficient to trigger the silicon controlled rectifier 22 into operation. If the overspeed condition persists for a number of cycles, this action is repeated, since each time that the switching commutator 16 is operated twice in succession, a sufficiently negative bias is supplied to the transistor 45 resulting in discharging the oscillator capacitor 21 and thereby eliminating the oscillator pulses to reduce the power energization applied to the motor until the motor has slowed down into substantial frequency synchronization with the pulse source. When frequency synchronization is obtained, the switching rate of commutator 16 occurs only once after each triggering of the silicon controlled rectifier 35, and therefore the overspeed control circuitry does not function and the circuitry operates in its normal mode of operation as discussed above.

It is to be particularly noted that the commutator 16 in the preferred circuit of FIGURE 2, is not connected in the power circuit of the motor and power transistor 38, and is therefore not required to switch the high current power pulse being delivered to the motor. This permits the commutator switch 16 to be made very small and lightweight having low current capacity contacts, and therefore permits considerable simplification of the system over that otherwise necessary.

It is also to be noted that all of the circuits employed in the preferred motor control function in the on-off switching mode, and therefore enables relatively inexpensive transistor, resistor and diodes to be employed in the preferred circuit, while providing precision control of the motor speed.

Despite the fact that the circuit provides both the high accuracy afforded by phase synchronization, as well as the advantages of frequency synchronization provided by the overspeed and underspeed controls, the circuit preferably includes a total of only five low power switching transistors, and one power transistor to achieve these functions, together with a low current capacity miniature commutator switch 16. These few components together with their associated miniature diodes and resistors may all be packaged within a housing that is as small as, or much smaller than, a fractional or sub-fractional horsepower motor 10 to provide the miniature, lightweight, and inexpensive control system as desired.

Although but one preferred embodiment of the invention has been illustrated and described, it is believed evident to those skilled in the art that many changes may be made without departing from the spirit and scope of this invention. Accordingly, this invention should be considered as being limited only by the following claims appended hereto.

What is claimed is:

1. A speed control for a motor comprising:
an oscillator for producing impulses at a rate proportional to desired motor speed,
a switch means responsive to the oscillator impulses for initiating the application of power pulse energization to the motor,
a commutator driven by the motor for producing reset impulses at a rate proportional to motor speed and energizing the switch means to terminate the power pulses,
an underspeed control including a capacitor for detecting when the frequency of the oscillator exceeds the frequency of the reset pulses to operate said switch means immediately after a reset impulse is received,
and an overspeed control for detecting when the frequency of the reset pulses exceed the frequency of the oscillator pulses for preventing the next succeeding oscillator pulse from energizing the switch means to thereby prevent the initiation of the next power pulse.

2. In a motor control for energizing a motor with duration modulated pulses to control the speed,
a power transistor for applying duration modulation impulses to the motor,
a biasing circuit including a solid state controlled rectifier for switching said power transistor into conduction and nonconduction,
a reference pulse generator for periodically triggering said controlled rectifier into operation,
and a circuit including a low current capacity mechanical commutator being driven by said motor for periodically extinguishing said controlled rectifier.

3. A motor control circuit for pulsing a motor with duration modulated impulses to control the speed,
a power switch applying means for applying power impulses to the motor,
a trigger switch means for controlling the operation of the power switch,
a repetitive pulse source for repetitively operating said trigger switch means,
a low current commutator switch being driven by the motor for resetting said trigger switch means after each operation thereof when the motor is in frequency synchronization with the repetitive pulse source,
an underspeed detector coupling the repetitive pulse source to the trigger switch means and being controlled by said commutator to maintain the trigger switch means substantially continually energized in the event that the motor speed is below frequency synchronization with the repetitive pulse source,
and an overspeed control being energized responsively to said commutator and detecting when the motor speed exceeds the frequency of the repetitive pulse source for maintaining the trigger switch means in substantially a continuous reset condition until the motor slows down into synchronism with the repetitive pulse source.

4. A phase and frequency synchronizing speed control for a motor,
a reference source of pulses operating at a frequency corresponding to the desired motor speed,
a feedback pulse source producing pulses at a frequency corresponding to actual motor speed,
and control means including a phase detector for applying duration modulated power pulses to the motor corresponding to the phase difference between the reference pulses and feedback pulses,
said control means including an underspeed control responsive to the frequency of the reference source exceeding the frequency of the feedback source for initiating each succeeding power pulse directly after a feedback pulse is received,
said control means further including an overspeed control responsive to the frequency of the feedback source exceeding the frequency of the reference source to delay the initiation of the next power pulse.

5. A motor control for energizing a motor with frequency modulated and duration modulated impulses to control its speed,
a reference source of pulses,
control means including a phase detector for energizing the motor with duration modulated pulses at the frequency of the reference source when the motor speed is in synchronism with the frequency of the reference source,
an underspeed frequency detector responsive to the frequency of the reference source exceeding the speed of the motor for initiating each succeeding power pulse earlier thereby to increase the average power energizing the motor,
and an overspeed frequency detector responsive to the frequency of the reference source being lower than the speed of the motor for delaying the initiation of succeeding power pulses thereby to reduce the average power applied to the motor.

6. A motor control for applying variable duration modulated impulses to a motor for controlling its speed,
a reference pulse source,
control means responsive to the pulse source and to the speed of the motor for applying constant frequency power pulses at the frequency of the reference source but of variable duration to regulate against minor changes in motor speed,
and overspeed control means for overriding said control means to delay the application of said power pulses when the motor speed exceeds the frequency of the reference pulse source by a major amount.

7. In the motor control of claim 6, an underspeed control means for overriding said control means to advance the application of power pulses to the motor when the frequency of the reference source exceeds the motor speed by a major amount.

8. A control system for applying frequency modulated and duration modulated power impulses to a motor to control its speed comprising: a reference pulse generator, a motor driven cyclically operating commutator, control means including a phase detector for varying the duration of power pulses applied to the motor corresponding to the phase delay between the pulses produced by the reference generator and the cycles of the commutator, an underspeed detector circuit for determining when the frequency of the reference pulse generator exceeds the cyclic frequency of the commutator for advancing the application of each succeeding power pulse to occur immediately after the preceding power pulse, and an overspeed detector for determining when the cyclic frequency of the commutator exceeds that of the reference pulse generator for delaying the application of each succeeding power pulse.

9. In the system of claim 8, said underspeed detector including a capacitor means and a switch, said capacitor means being energized by the reference generator to store each reference pulse, and said switch means being controlled by said commutator to discharge said capacitor at a rate corresponding to motor speed, thereby to increase the charge of the capacitor in response to the pulse generator frequency exceeding the motor speed.

10. In the system of claim 8, said overspeed detector comprising a switch means energized by said commutator at a rate proportional to motor speed and disabling the initiation of succeeding power pulses when the motor speed exceeds the frequency of the reference pulse source.

11. In the system of claim 8, a power transistor for applying the power pulses to the motor, a controlled rectifier for biasing said transistor into conducting and nonconducting condition, means responsive to the reference pulse generator for triggering said controlled rectifier, and means responsive to the commutator for resetting the controlled rectifier.

12. In the system of claim 8, said reference pulse generator comprising a relaxation oscillator including a storage capacitor, and said overspeed detector comprising a switch means for short circuiting said storage capacitor when the rate of operation of the commutator exceeds the frequency of the reference pulse generator.

13. In the system of claim 8, said underspeed detector comprising a memory capacitor and a controllable switch, said reference pulse generator energizing said capacitor to store pulses thereon, and said switch being energizable at a rate controlled by the speed of the motor, whereby a resulting charge on said capacitor is provided in the event that the reference pulse generator frequency exceeds the motor speed.

14. In the system of claim 8, said underspeed control including a capacitor memory to detect a difference in frequency when the frequency of the pulse source exceeds the motor speed, and said overspeed control including a memory capacitor to detect when the speed of the motor exceeds the frequency of the pulse source, and means responsive to said underspeed memory capacitor for advancing the application of power pulses to the motor, and means responsive to the overspeed memory capacitor for delaying the application of power pulses to the motor.

References Cited by the Examiner
UNITED STATES PATENTS

| | | | |
|---|---|---|---|
| 3,154,730 | 10/1964 | Houldin et al. | 318—341 |
| 3,192,461 | 6/1965 | Hohne | 318—318 |
| 3,214,666 | 10/1965 | Clerc | 318—341 X |

ORIS L. RADER, *Primary Examiner.*

S. GORDON, J. C. BERENZWEIG, *Assistant Examiners.*